US012191596B2

(12) United States Patent
Johnson et al.

(10) Patent No.: US 12,191,596 B2
(45) Date of Patent: Jan. 7, 2025

(54) ELECTRICAL CONNECTOR AND METHOD OF MAKING AN ELECTRICAL CONNECTION

(71) Applicant: Cummins Emission Solutions Inc., Columbus, IN (US)

(72) Inventors: Ryan M. Johnson, Cottage Grove, WI (US); Colin L. Norris, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 338 days.

(21) Appl. No.: 17/888,932

(22) Filed: Aug. 16, 2022

(65) Prior Publication Data

US 2024/0063573 A1 Feb. 22, 2024

(51) Int. Cl.

| | |
|---|---|
| ***H01R 4/38*** | (2006.01) |
| ***F01N 3/20*** | (2006.01) |
| ***H01R 4/02*** | (2006.01) |
| ***H01R 13/434*** | (2006.01) |
| ***H01R 13/52*** | (2006.01) |
| ***H01R 43/00*** | (2006.01) |

(Continued)

(52) U.S. Cl.

CPC ....... *H01R 13/5202* (2013.01); *F01N 3/2013* (2013.01); *H01R 4/023* (2013.01); *H01R 13/434* (2013.01); *H01R 13/5216* (2013.01); *H01R 43/005* (2013.01); *H01R 43/0207* (2013.01); *H01R 43/04* (2013.01)

(58) Field of Classification Search

CPC .............................. H01R 13/5202; H01R 4/56

See application file for complete search history.

(56) References Cited

U.S. PATENT DOCUMENTS 203,931 A * 2/1878 Nick
2,581,655 A * 1/1952 Harden .................. H01T 13/06 439/805

(Continued)

FOREIGN PATENT DOCUMENTS

WO WO-2019/170440 A1 9/2019

OTHER PUBLICATIONS

International Search Report and Written Opinion in PCT Application No. PCT/US2023/0302278, issued Nov. 14, 2023.

(Continued)

*Primary Examiner* — Neil Abrams
(74) *Attorney, Agent, or Firm* — Foley & Lardner LLP

(57) ABSTRACT

An electrical connector includes: a male connector comprising a wire connection portion configured to be connected to a wire, and a pin connection portion configured to contact a conductor pin in an electrically conductive manner; a collar comprising a collar cylindrical body portion and a collar outer flange having a first surface and a second surface; a nut comprising a nut cylindrical body portion and a nut inner flange having a first surface that faces the second surface of the collar outer flange; a first seal that surrounds the collar cylindrical body portion and is positioned between the second surface of the collar outer flange and the first surface of the nut inner flange; and a second seal that surrounds the pin connection portion of the male connector and is positioned between an end surface of the nut cylindrical body portion and a first surface of the wire connection portion.

28 Claims, 5 Drawing Sheets

(51) Int. Cl.

| | |
|---|---|
| ***H01R 43/02*** | (2006.01) |
| ***H01R 43/04*** | (2006.01) |

(56) References Cited

U.S. PATENT DOCUMENTS

| | | | | | |
|---|---|---|---|---|---|
| 2,931,009 | A * | 3/1960 | Dutton | H01R 4/56 439/805 |
| 3,010,747 | A * | 11/1961 | Bondon | F16B 7/025 174/21 C |
| 3,681,739 | A | 8/1972 | Kornick | |
| 3,798,348 | A * | 3/1974 | van Toorn | H05B 3/06 439/805 |
| 4,046,641 | A | 9/1977 | Ullrich | |
| D325,899 | S | 5/1992 | Krokaugger | |
| 6,726,510 | B2 | 4/2004 | Schad et al. | |
| 6,796,853 | B1 * | 9/2004 | Tomasino | H01R 4/5058 439/805 |
| 7,959,477 | B2 * | 6/2011 | Steele | H02G 15/04 439/805 |
| 8,987,595 | B2 | 3/2015 | Bamgarner | |
| 2003/0092325 | A1 | 5/2003 | Schad et al. | |
| 2021/0281007 | A1 | 9/2021 | Qin | |
| 2022/0302614 | A1 | 9/2022 | Peltier et al. | |

OTHER PUBLICATIONS

Notice of Allowance in Design U.S. Appl. No. 29/849,663 issued Jan. 26, 2024.

* cited by examiner

ELECTRICAL CONNECTOR AND METHOD OF MAKING AN ELECTRICAL CONNECTION

BACKGROUND

The present application relates generally to the field of aftertreatment systems for use with internal combustion (IC) engines. More specifically, the present application relates to electrical connectors and methods of making an electrical connection.

Exhaust aftertreatment systems are used to receive and treat exhaust gas generated by engines such as IC engines. Conventional exhaust gas aftertreatment systems include any of several different components to reduce the levels of harmful exhaust emissions present in exhaust gas. Such aftertreatment systems may include a selective catalytic reduction (SCR) system, a heater configured to heat exhaust gas upstream of the SCR system, and an electrical connector that provides an electrical current to the heater. Providing an electrical current to the heater allows the heater to heat the exhaust gas to a temperature to facilitate treatment by the SCR system.

SUMMARY

Known electrical connectors are susceptible to corrosion from moisture during operation in hot environments, are limited to operating at a maximum temperature of 150 degrees Celsius, and/or generate heat at the electrical connector that reduces the efficiency of the system.

In some embodiments, an electrical connector includes a male connector having a wire connection portion configured to be connected to a wire. The electrical connector also includes a pin connection portion having an outer diameter less than that of the wire connection portion. The pin connection portion is configured to contact a conductor pin in an electrically conductive manner and has male threads. The electrical connector also includes a collar configured to surround the conductor pin. The collar has a collar cylindrical body portion, and a collar outer flange. The collar outer flange has an outer diameter larger than that of the collar cylindrical body portion, a first surface configured to contact the pin connection portion of the male connector, and a second surface opposite the first surface. The electrical connector also includes a nut configured to surround the pin connection portion of the male connector, the collar outer flange, and part of the collar cylindrical body portion. The nut has a nut cylindrical body portion, and a nut inner flange. The nut inner flange has an inner diameter less than that of the nut cylindrical body portion, and has a first surface that faces the second surface of the collar outer flange. The electrical connector also includes a first seal that surrounds the collar cylindrical body portion and is positioned between the second surface of the collar outer flange and the first surface of the nut inner flange. The electrical connector also includes a second seal that surrounds the pin connection portion of the male connector and is positioned between an end surface of the nut cylindrical body portion and a first surface of the wire connection portion that faces the collar.

In some embodiments, an aftertreatment system includes a heater having a conductor pin. The aftertreatment system also includes a heater power source having a wire. The aftertreatment system also includes an electrical connector. The electrical connector includes a male connector having a wire connection portion configured to be connected to the wire. The electrical connector also includes a pin connection portion having an outer diameter less than that of the wire connection portion. The pin connection portion is configured to contact the conductor pin in an electrically conductive manner and has male threads. The electrical connector also includes a collar configured to surround the conductor pin. The collar has a collar cylindrical body portion, and a collar outer flange. The collar outer flange has an outer diameter larger than that of the collar cylindrical body portion, a first surface configured to contact the pin connection portion of the male connector, and a second surface opposite the first surface. The electrical connector also includes a nut configured to surround the pin connection portion of the male connector, the collar outer flange, and part of the collar cylindrical body portion. The nut has a nut cylindrical body portion, and a nut inner flange. The nut inner flange has an inner diameter less than that of the nut cylindrical body portion, and has a first surface that faces the second surface of the collar outer flange. The electrical connector also includes a first seal that surrounds the collar cylindrical body portion and is positioned between the second surface of the collar outer flange and the first surface of the nut inner flange. The electrical connector also includes a second seal that surrounds the pin connection portion of the male connector and is positioned between an end surface of the nut cylindrical body portion and a first surface of the wire connection portion that faces the collar.

In some embodiments, a method of making an electrical connection includes providing an electrical connector. The electrical connector includes a male connector having a wire connection portion configured to be connected to a wire. The electrical connector also includes a pin connection portion having an outer diameter less than that of the wire connection portion. The pin connection portion is configured to contact a conductor pin in an electrically conductive manner and has male threads. The electrical connector also includes a collar configured to surround the conductor pin. The collar has a collar cylindrical body portion, and a collar outer flange. The collar outer flange has an outer diameter larger than that of the collar cylindrical body portion, a first surface configured to contact the pin connection portion of the male connector, and a second surface opposite the first surface. The electrical connector also includes a nut configured to surround the pin connection portion of the male connector, the collar outer flange, and part of the collar cylindrical body portion. The nut has a nut cylindrical body portion, and a nut inner flange. The nut inner flange has an inner diameter less than that of the nut cylindrical body portion, and has a first surface that faces the second surface of the collar outer flange. The electrical connector also includes a first seal that surrounds the collar cylindrical body portion and is positioned between the second surface of the collar outer flange and the first surface of the nut inner flange. The electrical connector also includes a second seal that surrounds the pin connection portion of the male connector and is positioned between an end surface of the nut cylindrical body portion and a first surface of the wire connection portion that faces the collar. The method also includes inserting the conductor pin into the collar so that the conductor pin contacts the pin connection portion of the male connector. The method also includes crimping the collar cylindrical body portion to the conductor pin. The method also includes attaching the collar outer flange to the conductor pin. The method also includes attaching the wire to the wire connection portion of the male connector. The method also includes tightening the nut to connect the pin connection portion of the male connector, the collar, the conductor pin, the first seal, and the second seal.

BRIEF DESCRIPTION OF THE DRAWINGS

A clear conception of the advantages and features constituting the present disclosure, and of the construction and operation of typical mechanisms provided with the present disclosure, will become more readily apparent by referring to the exemplary, and therefore non-limiting, embodiments illustrated in the drawings accompanying and forming a part of this specification, wherein like reference numerals designate the same elements in the several views, and in which.

Figure 1A:
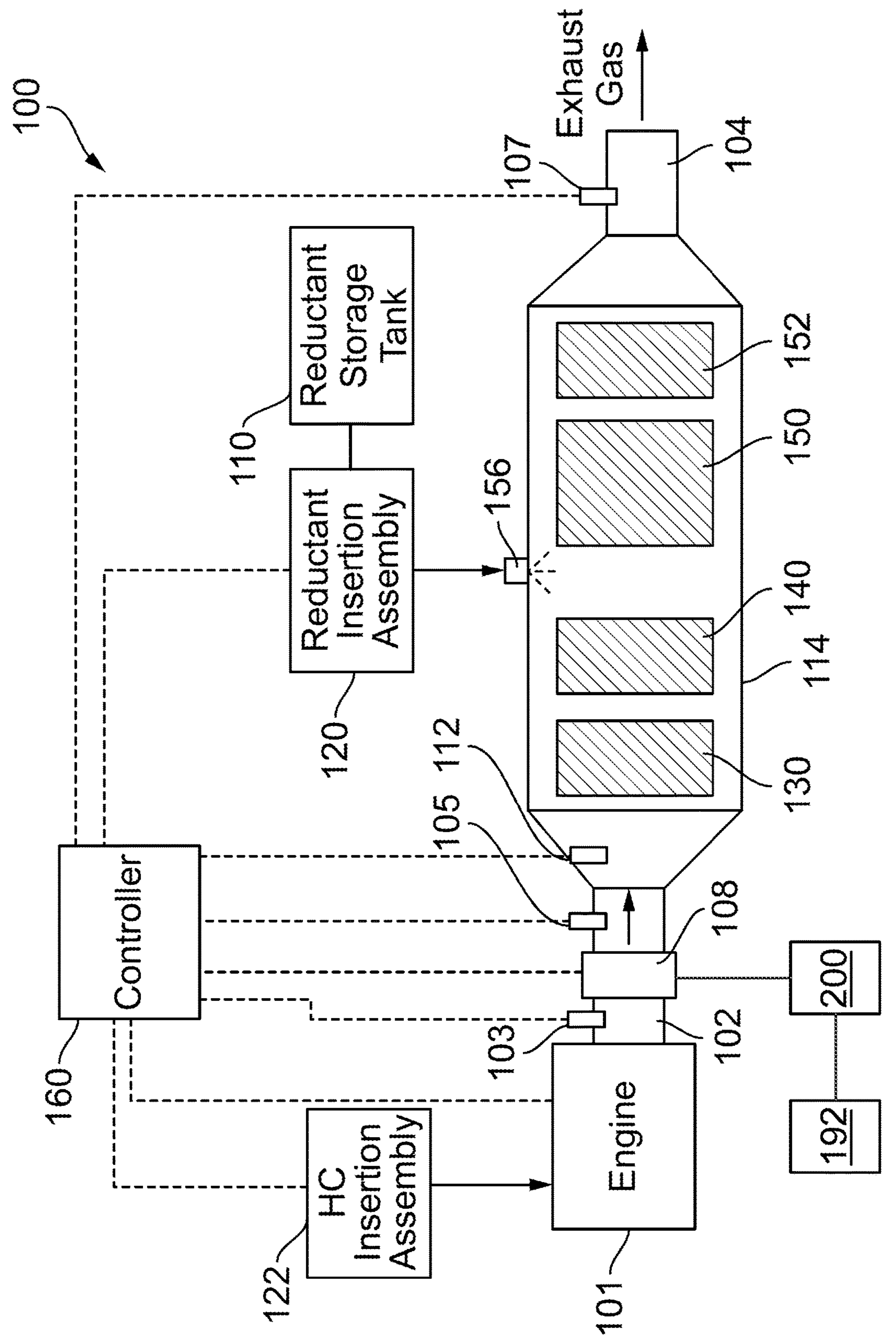
FIG. 1A is a diagram of an aftertreatment system showing a position of an electrical connector, according to an embodiment.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

To improve the heating of exhaust gases in aftertreatment systems that use electrical connectors, it may be desirable to use the electrical connector to provide a high electrical current to a heater. However, it can be difficult to conduct a high electrical current without corrosion of the electrical connector over time. As the electrical connector corrodes, the resistance of the electrical connector increases and results in increased temperature at the electrical connector, which can lead to local damage and potential reduction of the ability to deliver thermal energy to the exhaust, which in turn could impact aftertreatment systems and system emissions.

Various embodiments of the electrical connector described herein may provide one or more advantages, including, for example: (1) improved electrical conductivity, improved ability to electrically isolate the electrical connector, and reduced heat generation at the electrical connector through a low resistance connection due to the low resistivity of copper, as compared to using a stainless steel stub with a stainless steel electrical connector; (2) improved temperature resistance and moisture reduction through silicone seals that prevent corrosion; (3) transmitting up to 250 amps while operating at up to 200 degrees Celsius and having sealing of the electrical path; (4) providing robustness for an electrical circuit against the vibration profile experienced with highway trucks; (5) reduced mass, volume, and cost as compared to using a junction box with ring eyelets bolted to buss bars; (6) reduced risk of breaking the conductor pin, increased ease of installation, and facilitation of tightening and undoing for service, through use of a free spinning nut that allows for installing the electrical connector without having to twist the wire or the conductor pin; and (7) lower cost and improved manufacturability and servicing conditions as compared to using a permanent connection between the electrical connector and the conductor pin.

Overview of Exhaust Gas Aftertreatment Systems

FIG. 1 depicts an aftertreatment system 100, according to an embodiment. The aftertreatment system 100 includes a heater 108 having a conductor pin 260, a heater power source 192 having a wire 250, and an electrical connector 200 (discussed in further detail herein). The aftertreatment system 100 is configured to receive exhaust gas (e.g., diesel exhaust gas, etc.) from an engine 101 (e.g., motor, etc.) and treat constituents (e.g., NOx, CO, $CO_2$, etc.) of the exhaust gas. The aftertreatment system 100 may also include an inlet conduit 102, a first temperature sensor 103, an outlet conduit 104, a second temperature sensor 105, an outlet sensor 107, a reductant storage tank 110, a gas sensor 112, a reductant insertion assembly 120, a hydrocarbon insertion assembly 122, an oxidation catalyst 130, a filter 140, a selective catalytic reduction (SCR) system 150, a reductant port 156, an ammonia oxidation ($AMO_X$) catalyst 152, a controller 160, a heater control unit (HCU) 162, a switched battery 194, and/or a fuse 196.

The engine 101 may include, for example, a diesel engine, a gasoline engine, a natural gas engine, a dual fuel engine, a biodiesel engine, an E-85 engine, or any other suitable engine. The engine 101 combusts fuel and generates an exhaust gas that includes NOx, CO, $CO_2$, and other constituents. The engine 101 may include other components, for example, a transmission, fuel insertion assemblies, a generator or alternator to convert the mechanical power produced by the engine into electrical power (e.g., to power the heater 108, the gas sensor 112, the reductant insertion assembly 120, the hydrocarbon insertion assembly 122, and the controller 160, etc.).

The aftertreatment system 100 may include a housing 114 (e.g., casing, cover, container, shell, etc.) in which various aftertreatment components of the aftertreatment system 100 are disposed. The housing 114 may be formed from a rigid, heat-resistant and corrosion-resistant material, for example stainless steel, iron, aluminum, metals, ceramics, or any other suitable material. The housing 114 may have any suitable cross-section, for example, circular, square, rectangular, oval, elliptical, polygonal, or any other suitable shape.

The aftertreatment system 100 may include an inlet conduit 102 (e.g., channel, duct, pipe, tube, chute, etc.) that is fluidly coupled to an inlet of the housing 114 and structured to receive exhaust gas from the engine 101 and communicate the exhaust gas to an internal volume defined by the housing 114. Furthermore, an outlet conduit 104 (e.g., channel, duct, pipe, tube, chute, etc.) may be coupled to an outlet of the housing 114 and structured to expel treated exhaust gas into the environment (e.g., treated to remove particulate matter such as soot by the filter 140 and/or reduce constituents of the exhaust gas such as NOx gases, CO, unburnt hydrocarbons, etc. included in the exhaust gas by the SCR system 150 and the oxidation catalyst 130).

The aftertreatment system 100 includes a heater 108 (e.g., ceramic heater, electric heater, etc.) that is disposed upstream of the other aftertreatment components, for example, in the inlet conduit 102 proximate to an engine exhaust manifold (e.g., at an outlet of a turbo coupled to the engine 101). The heater 108 may be an electrical heater, which may have an input voltage in a range of 36 to 52 V and a heater power in a range of 10 to 100 kW (i.e., the electrical power consumed by the heater 108 to generate heat). As used herein, a range of X to Y includes X, Y, and values between X and Y. In some embodiments, the heater 108 is a 48 V, 10 kW electric heater. The heater 108 is configured to selectively heat the exhaust gas entering the aftertreatment system 100, such that heating of the exhaust gas by the heater 108 causes an increase in a temperature of a heating element of the gas sensor 112 as the heated exhaust gas flows over the gas sensor 112. For example, the heater 108 can be selectively activated to heat the exhaust gas flowing therethrough towards the gas sensor 112 and the aftertreatment components, and thereby heat the gas sensor 112, as well as downstream aftertreatment components (e.g., heat the oxidation catalyst 130 to a light-off temperature, heat the SCR system 150 to its operating temperature, etc.).

Figure 2:
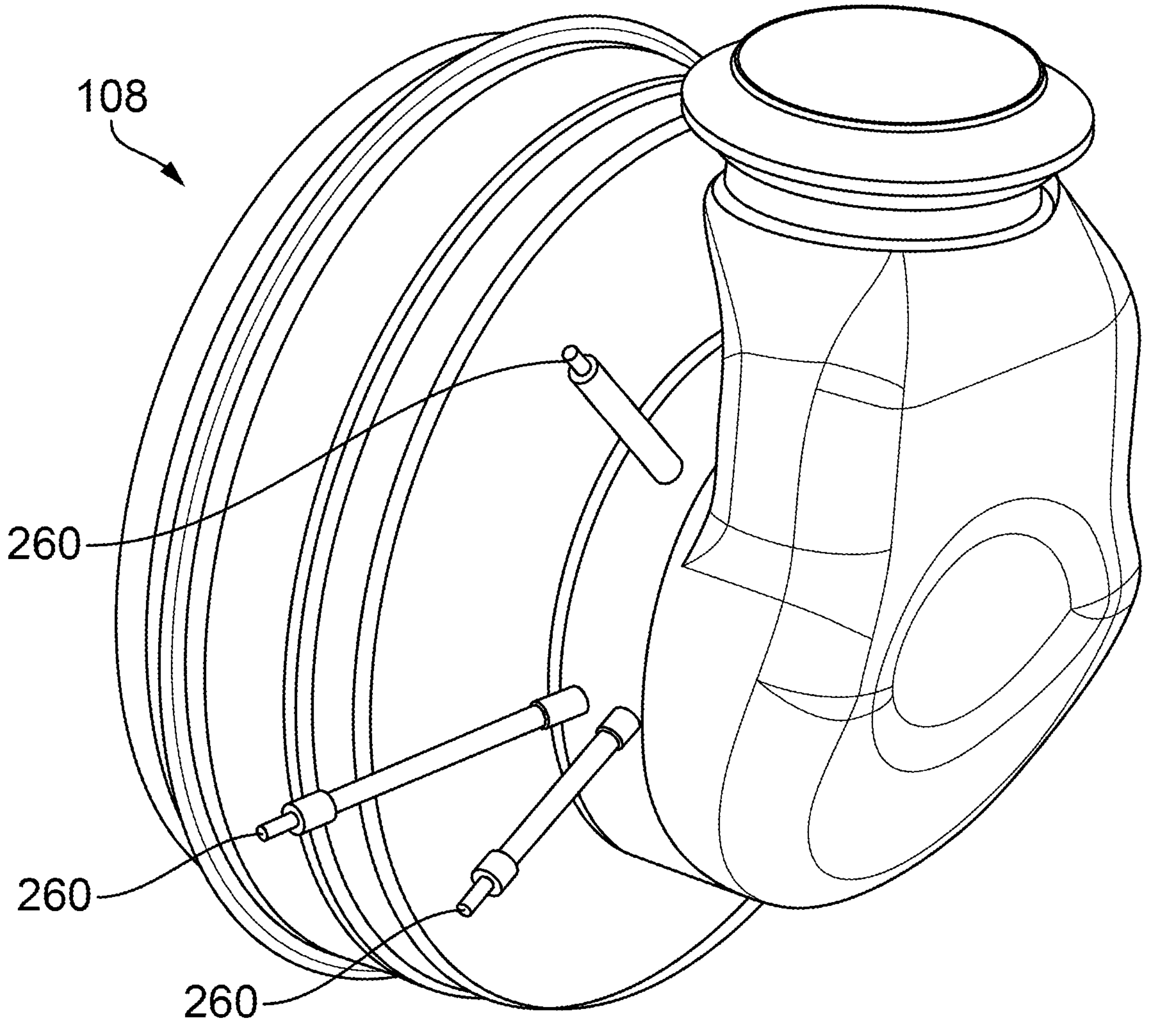
FIG. 2 is a right, rear, top perspective view of a heater of the aftertreatment system of FIG. 1.

The heater 108 has a conductor pin 260 (discussed in further detail herein) for connecting to an electrical connector 200 (discussed in further detail herein). In FIG. 2, the heater 108 has three conductor pins 260. In FIG. 2, two of the three conductor pins 260 are supply pins configured to receive electricity to supply the heater 108, and one of the three conductor pins 260 is a ground pin configured to ground the heater 108. In other embodiments, the heater 108 may have more than two supply pins.

The aftertreatment system 100 includes a heater power source 192. The heater power source 192 has a wire 250 (discussed in further detail herein) for connecting to the electrical connector 200. The heater power source 192 may have a voltage that is approximately in a range of 36-52 V.

The aftertreatment system 100 includes an electrical connector 200. The electrical connector 200 is connected to the wire 250 of the heater power source 192. The electrical connector 200 is connected to the conductor pin 260 of the heater 108.

The aftertreatment system 100 may include a first temperature sensor 103 (e.g., detector, indicator, etc.). The first temperature sensor 103 may be positioned in the inlet conduit 102 upstream of the heater 108. The first temperature sensor 103 is configured to measure an upstream exhaust gas temperature of the exhaust gas upstream of the heater 108. In some embodiments, a second temperature sensor 105 (e.g., detector, indicator, etc.) is also disposed downstream of the heater 108, for example, proximate to an outlet of the heater 108 and configured to measure a downstream exhaust gas temperature of the exhaust gas downstream of the heater 108. In some embodiments, other sensors, for example, pressure sensors, oxygen sensors, and/or any other sensors configured to measure one or more operational parameters of the exhaust gas entering the aftertreatment system 100 may be disposed in the inlet conduit 102. In some embodiments, each of the first temperature sensor 103 and the second temperature sensor 105 may be excluded, and instead, the upstream and downstream exhaust gas temperatures may be determined virtually (e.g., by the controller 160), using equations, algorithms, or look up tables, for example, based on operating parameters of the engine 101 exhaust gas flow rate, heater power consumed, etc.

The aftertreatment system 100 may include an oxidation catalyst 130. The oxidation catalyst 130 is disposed downstream of the heater 108 in the housing 114 and configured to decompose unburnt hydrocarbons and/or CO included in the exhaust gas. In some embodiments, the oxidation catalyst 130 may include a diesel oxidation catalyst. The hydrocarbon insertion assembly 122 is configured to selectively insert hydrocarbons (e.g., the same fuel that is being consumed by the engine 101) upstream of the oxidation catalyst 130, for example, into the engine 101. When a temperature of the oxidation catalyst 130 is equal to or above a light-off temperature of the oxidation catalyst 130, the oxidation catalyst 130 catalyzes combustion of the inserted hydrocarbons so as to cause an increase in the temperature of the exhaust gas. In some embodiments, the hydrocarbon insertion assembly 122 may be selectively activated (e.g., by the controller 160) to insert hydrocarbons into the oxidation catalyst 130 for heating the exhaust gas and thereby, the downstream filter 140 and SCR system 150. In some embodiments, insertion of the hydrocarbons may heat the exhaust gas to a sufficient temperature to regenerate the filter 140 by burning off particulate matter that may have accumulated on the filter 140, and/or regenerate the SCR system 150 by evaporating reductant deposits deposited on the SCR system 150 or internal surfaces of the aftertreatment system 100.

The aftertreatment system 100 may include a gas sensor 112 (e.g., a NOx sensor, detector, indicator, etc.) that is disposed in the housing 114 downstream of the heater 108 and upstream of any aftertreatment component that treats the constituents of the exhaust gas. For example, as shown in FIG. 1, the gas sensor 112 is disposed downstream of the heater 108 and upstream of the oxidation catalyst 130.

The aftertreatment system 100 may include an outlet sensor 107 (e.g., detector, indicator, etc.). The outlet sensor 107 may be positioned in the outlet conduit 104. The outlet sensor 107 may comprise a second NOx sensor configured to determine an amount of NOx gases expelled into the environment after passing through the SCR system 150. In other embodiments, the outlet sensor 107 may comprise a particulate matter sensor configured to determine an amount of particulate matter (e.g., soot included in the exhaust gas exiting the filter 140) in the exhaust gas being expelled into the environment. In still other embodiments, the outlet sensor 107 may comprise an ammonia sensor configured to measure an amount of ammonia in the exhaust gas flowing out of the SCR system 150, i.e., determine the ammonia slip. The $AMO_X$ catalyst 152 may be positioned downstream of the SCR system 150 and formulated to decompose any unreacted ammonia that flows past the SCR system 150.

The aftertreatment system 100 may include a filter 140 (e.g., mesh, separator, etc.) that is disposed downstream of the oxidation catalyst 130 and upstream of the SCR system 150 and configured to remove particulate matter (e.g., soot, debris, inorganic particles, etc.) from the exhaust gas. In some embodiments, the filter 140 may include a ceramic filter. In some embodiments, the filter 140 may include a cordierite filter which can, for example, be an asymmetric filter. In yet other embodiments, the filter 140 may be catalyzed.

The aftertreatment system 100 may include a SCR system 150 that is configured to decompose constituents of an exhaust gas flowing therethrough in the presence of a reductant, as described herein. In some embodiments, the SCR system 150 may include a selective catalytic reduction filter (SCRF). The SCR system 150 includes a SCR catalyst configured to catalyze decomposition of the NOx gases into its constituents in the presence of a reductant. Any suitable SCR catalyst may be used such as, for example, platinum, palladium, rhodium, cerium, iron, manganese, copper, vanadium based catalyst, any other suitable catalyst, or a combination thereof. The SCR catalyst may be disposed on a suitable substrate such as, for example, a ceramic (e.g., cordierite) or metallic (e.g., kanthal) monolith core that can, for example, define a honeycomb structure. A washcoat can also be used as a carrier material for the SCR catalyst. Such washcoat materials may comprise, for example, aluminum oxide, titanium dioxide, silicon dioxide, any other suitable washcoat material, or a combination thereof.

Although FIG. 1 shows only the oxidation catalyst 130, the filter 140, the SCR system 150, and the $AMO_X$ catalyst 152 disposed in the internal volume defined by the housing 114, in other embodiments, a plurality of aftertreatment components may be disposed in the internal volume defined by the housing 114 in addition to, or in place of the oxidation catalyst 130, the filter 140, the SCR system 150, and the $AMO_X$ catalyst 152. Such aftertreatment components may include, for example, a two-way catalyst, mixers, baffle plates, secondary filters (e.g., a secondary partial flow or catalyzed filter) and/or any other suitable aftertreatment component.

The aftertreatment system 100 may include a reductant port 156 (e.g., opening, outlet, etc.). The reductant port 156 may be positioned on a sidewall of the housing 114 and structured to allow insertion of a reductant therethrough into the internal volume defined by the housing 114. The reductant port 156 may be positioned upstream of the SCR system 150 (e.g., to allow reductant to be inserted into the exhaust gas upstream of the SCR system 150) or over the SCR system 150 (e.g., to allow reductant to be inserted directly on the SCR system 150). Mixers, baffles, vanes or other structures may be positioned in the housing 114 upstream of the SCR system 150 (e.g., between the filter 140 and the SCR system 150) so as to facilitate mixing of the reductant with the exhaust gas.

The aftertreatment system 100 may include a reductant storage tank 110 (e.g., container, reservoir, etc.) that is structured to store a reductant. The reductant is formulated to facilitate decomposition of the constituents of the exhaust gas (e.g., NOx gases included in the exhaust gas). Any suitable reductant may be used. In some embodiments, the exhaust gas comprises a diesel exhaust gas and the reductant comprises a diesel exhaust fluid (DEF). For example, the DEF may comprise urea, an aqueous solution of urea, or any other fluid that comprises ammonia, by-products, or any other diesel exhaust fluid as is known in the arts (e.g., the DEF marketed under the name ADBLUE®). For example, the reductant may comprise an aqueous urea solution having a particular ratio of urea to water. In some embodiments, the reductant can comprise an aqueous urea solution including 32.5% by weight of urea and 67.5% by weight of deionized water, including 40% by weight of urea and 60% by weight of deionized water, or any other suitable ratio of urea to deionized water.

The aftertreatment system 100 may include a reductant insertion assembly 120 that is fluidly coupled to the reductant storage tank 110. The reductant insertion assembly 120 is configured to selectively insert the reductant into the SCR system 150 or upstream thereof, or upstream or into a mixer (not shown) positioned upstream of the SCR system 150. The reductant insertion assembly 120 may comprise various structures to facilitate receipt of the reductant from the reductant storage tank 110 and delivery to the SCR system 150, for example, pumps, valves, screens, filters, etc.

The aftertreatment system 100 may include a reductant injector that is fluidly coupled to the reductant insertion assembly 120 and configured to insert the reductant (e.g., a combined flow of reductant and compressed air) into the SCR system 150. In some embodiments, the reductant injector may include a nozzle having a predetermined diameter. In some embodiments, the reductant injector may be positioned in the reductant port 156 and structured to deliver a stream or a jet of the reductant into the internal volume of the housing 114 so as to deliver the reductant to the SCR system 150.

The controller 160 may be operatively coupled to the first temperature sensor 103, the second temperature sensor 105, the gas sensor 112, the heater 108, and in some embodiments, the reductant insertion assembly 120, the hydrocarbon insertion assembly 122, and/or the outlet sensor 107. For example, the controller 160 may be configured to receive an upstream exhaust gas temperature signal from the first temperature sensor 103 and receive a downstream exhaust gas temperature signal from the second temperature sensor 105 to determine the upstream exhaust gas temperature and the downstream exhaust gas temperature, respectively. The controller 160 may also be configured to selectively activate the heater 108, and/or a heater module coupled to the heater 108 so as to heat the exhaust gas flowing through the heater 108 towards the SCR system 150, for heating the SCR system 150.

The controller 160 is configured to determine the upstream exhaust gas temperature upstream of the heater 108, for example, based on the exhaust gas temperature signal received from the first temperature sensor 103. The upstream exhaust gas temperature corresponds to the temperature of the exhaust gas entering the aftertreatment system 100. In response, to the upstream exhaust gas temperature being less than a first threshold, for example, the dew point temperature (e.g., 100 degrees Celsius), the controller 160 causes activation of the heater 108. The controller 160 may also be configured to determine the downstream exhaust gas temperature downstream of the heater 108, for example, based on a signal received from the second temperature sensor 105.

The controller 160 may be operably coupled to the engine 101, the first temperature sensor 103, the second temperature sensor 105, the heater 108, the gas sensor 112, the outlet sensor 107, the reductant insertion assembly 120, the hydrocarbon insertion assembly 122, and/or various components of the aftertreatment system 100 using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections. In some embodiments, the controller 160 includes various circuitries or modules configured to perform the operations of the controller 160 described herein.

Figure 1B:
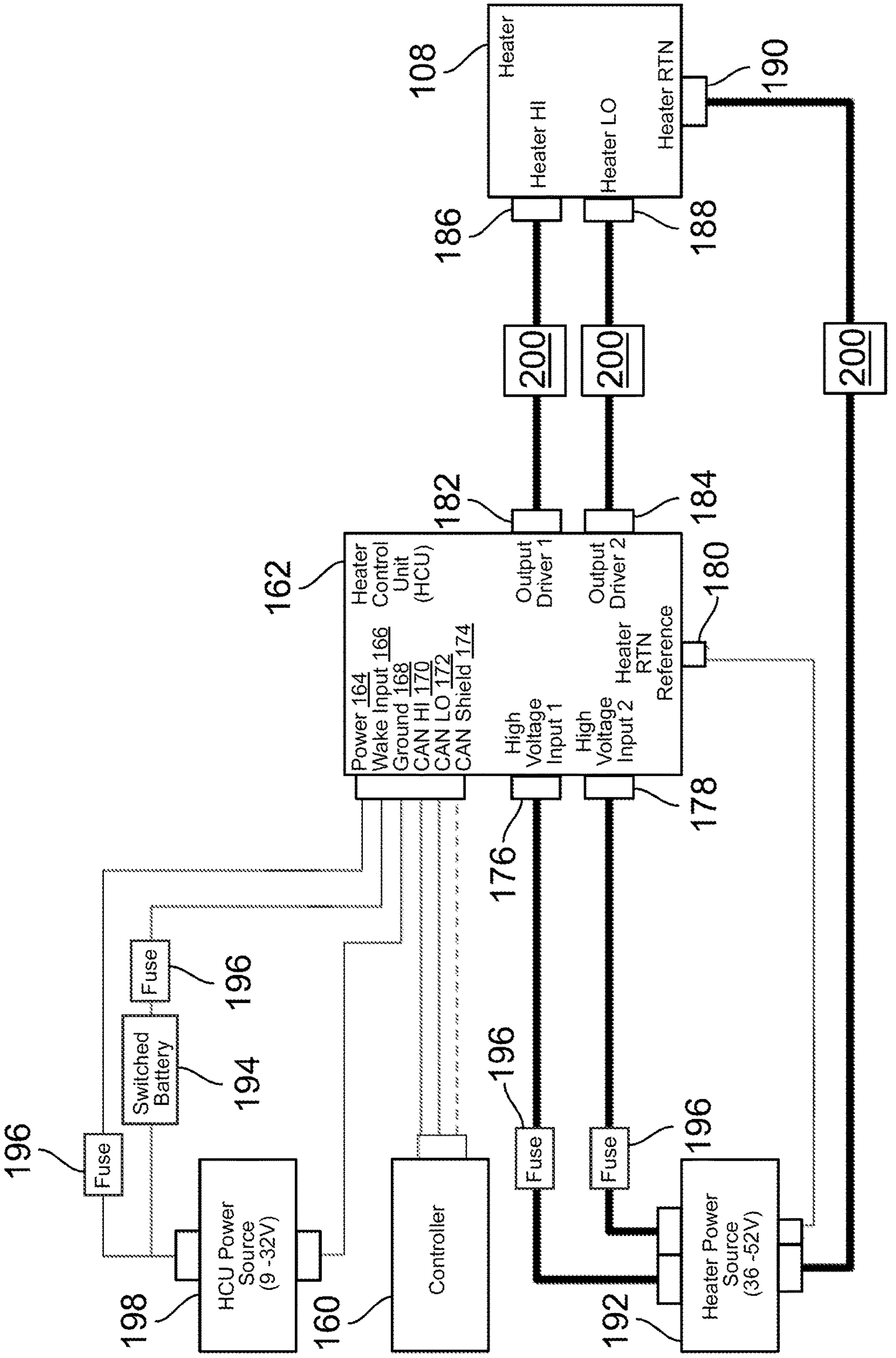
FIG. 1B is a diagram of an electrical system for a heater control unit for the aftertreatment system of FIG. 1 showing a position of the electrical connector.

In some embodiments, the aftertreatment system 100 may include a heater control unit (HCU) 162 for controlling the heater 108, as in FIG. 1B. The HCU 162 has a power connection 164, a wake input connection 166, a ground connection 168, a CAN HI connection 170, a CAN LO connection 172, a CAN shield connection 174, a first high voltage input 176, a second high voltage input 178, a heater return (RTN) reference 180, a first output driver 182, and a second output driver 184.

The HCU 162 is connected to the controller 160 by the CAN HI connection 170, CAN LO connection 172, and CAN shield connection 174 of the HCU 162. The CAN HI connection 170, CAN LO connection 172, and CAN shield connection 174 are configured to allow the exchange of signals between the controller 160 and the HCU 162. When signals are exchanged between the controller 160 and the HCU 162, the voltage of the connection between the controller 160 and the CAN HI connection 170 is greater than the voltage of the connection between the controller 160 and the CAN LO connection 172. The CAN shield connection 174 is configured to surround the links between the controller 160 and the CAN HI connection 170 and the CAN LO connection 172 and to reduce electromagnetic interference.

The aftertreatment system 100 may include a HCU power source 198 for providing power to the HCU 162. The HCU power source 198 has a voltage that is approximately in a range of 9-32 V. A first terminal of the HCU power source 198 is connected to the ground connection 168 of the HCU 162. A second terminal of the HCU power source 198 is connected and may provide a current both to the power connection 164 of the HCU 162 and to the wake input connection 166 of the HCU 162. When the HCU 162 is in a sleep mode, providing a current to the wake input connection 166 of the HCU 162 signals the HCU 162 to enter an active mode. When the HCU 162 is in an active mode, the HCU 162 receives power from the power connection 164 from the HCU power source 198. A fuse 196 is connected to the second terminal of the HCU power source 198 and the power connection 164 of the HCU 162. The fuse 196 may protect the HCU 162 in the event of the HCU power source 198 providing an excessive current to the HCU 162.

The aftertreatment system 100 may include a switched battery 194 positioned between the wake input connection 166 and the second terminal of the HCU power source 198. The switched battery 194 with the HCU power source 198 may provide a greater voltage to the wake input 168 of the HCU 162 than the voltage that the HCU power source 198 alone provides to the power connection 164 of the HCU 162. A fuse 196 is connected to the switched battery 194 and the power connection 164 of the HCU 162. The fuse 196 may protect the HCU 162 in the event of the HCU power source 198 and the switched battery 194 providing an excessive current to the HCU 162.

The HCU 162 is connected to the heater power source 192. A first end of the heater power source 192 is connected to and may provide a current to the first high voltage input 176 of the HCU 162. A fuse 196 is connected to the first end of the heater power source 192 and the power connection 164 of the HCU 162. A second end of the heater power source 192 is connected to and may provide a current to the second high voltage input 178 of the HCU 162. A fuse 196 is connected to the second end of the heater power source 192 and the second high voltage input 178 of the HCU 162. The fuses 196 may protect the HCU 162 in the event of the heater power source 192 providing an excessive current to the HCU 162. A third end of the heater power source 192 is connected to the heater RTN reference 180 of the HCU 162 and allows a current to be conducted from the HCU 162 to the heater power source 192.

The HCU 162 is connected to the heater 108. The heater 108 may have a heater HI connection 186, a heater LO connection 188, and a heater RTN connection 190. The heater RTN connection 190 of the heater 108 is connected with an electrical connector 200 to a fourth end of the heater power source 192 and allows a current to be conducted from the heater 108 to the heater power source 192.

The first output driver 182 of the HCU 162 is connected with an electrical connector 200 to and may provide a current to the heater HI connection 186. The second output driver 184 of the HCU 162 is connected with an electrical connector 200 to and may provide a current to the heater LO connection 188. When the HCU 162 provides a current to the heater 108 using the first output driver 182 and the second output driver 184, the voltage of the connection between the HCU 162 and the heater HI connection 186 is greater than the voltage of the connection between the HCU 162 and the heater LO connection 188.

Electrical Connectors

Figure 3:
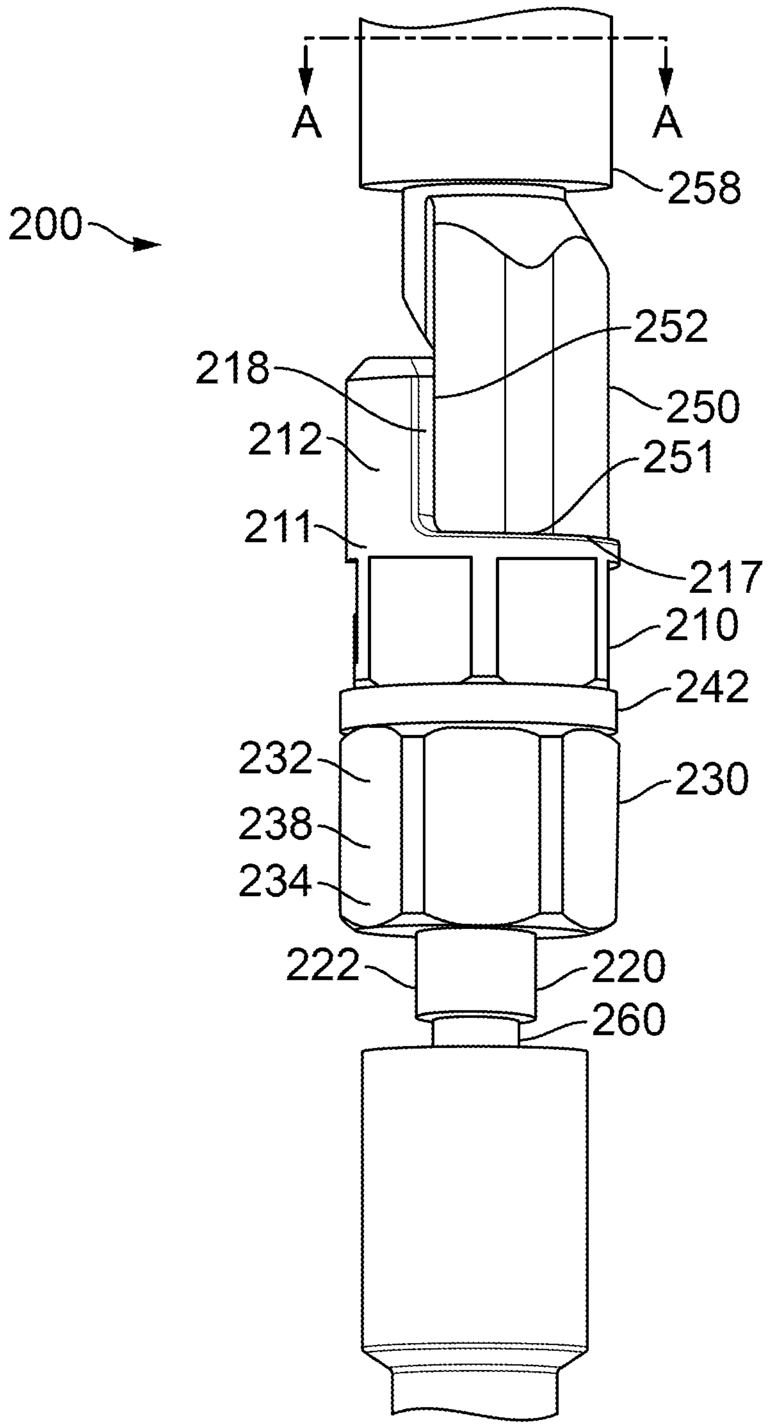
FIG. 3 is a side view of the electrical connector of the aftertreatment system of FIG. 1.
Figure 4:
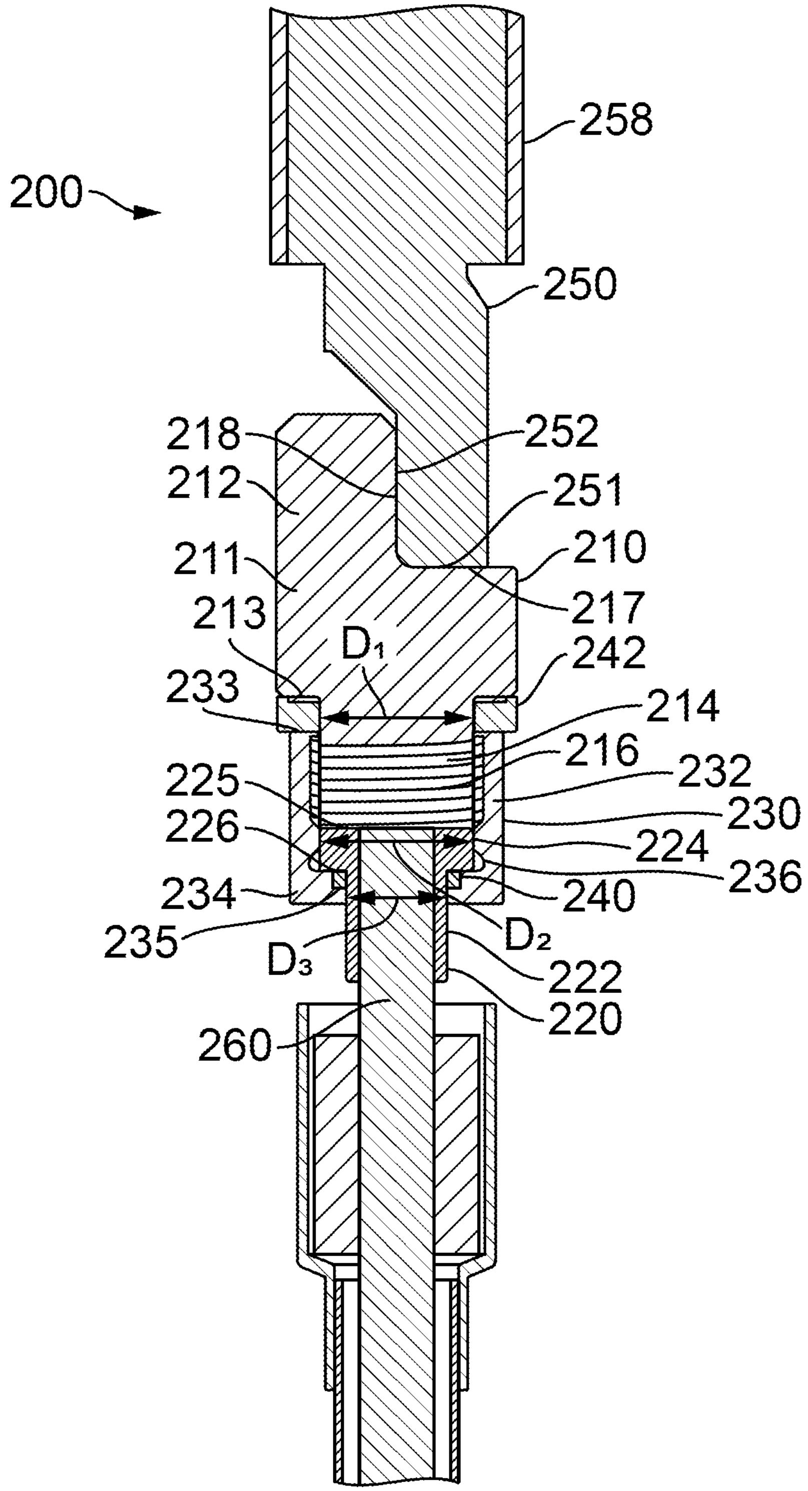
FIG. 4 is a cross-sectional side view of the electrical connector of the embodiment of FIG. 3, taken along the plane A-A in FIG. 3.

FIG. 3-4 depict an electrical connector 200 for conducting high electrical current in a hot environment according to an embodiment. The electrical connector 200 includes a male connector 210 having a wire connection portion 211 configured to be connected to a wire 250. The electrical connector 200 also includes a pin connection portion 214 having an outer diameter $D_1$ less than that of the wire connection portion 211. The pin connection portion 214 is configured to contact a conductor pin 260 in an electrically conductive manner and has male threads 216. The electrical connector 200 also includes a collar 220 configured to surround the conductor pin 260. The collar 220 has a collar cylindrical body portion 222, and a collar outer flange 224. The collar outer flange 224 has an outer diameter D2 larger than that of the collar cylindrical body portion 222, a first surface 225 configured to contact the pin connection portion 214 of the male connector 210, and a second surface 226 opposite the first surface 225. The electrical connector 200 also includes a nut 230 configured to surround the pin connection portion 214 of the male connector 210, the collar outer flange 224, and part of the collar cylindrical body portion 222. The nut 230 has a nut cylindrical body portion 232, and a nut inner flange 234. The nut inner flange 234 has an inner diameter D3 less than that of the nut cylindrical body portion 232, and has a first surface 235 that faces the second surface 226 of the collar outer flange 224. The electrical connector 200 also includes a first seal 240 that surrounds the collar cylindrical body portion 222 and is positioned between the second surface 226 of the collar outer flange 224 and the first surface 235 of the nut inner flange 234. The electrical connector 200 also includes a second seal 242 that surrounds the pin connection portion 214 of the male connector 210 and is positioned between an end surface 233 of the nut cylindrical body portion 232 and a first surface 213 of the wire connection portion 211 that faces the collar 220.

The electrical connector 200 (e.g., conductor, etc.) includes a male connector 210 (e.g., conductor, plug, etc.). The male connector 210 may be made of copper, silver, or other suitable materials. The male connector 210 enables a low-resistance connection to a conductor pin 260.

The male connector 210 includes a wire connection portion 211 configured to be connected to a wire 250 (e.g., cable, coil, line, etc.). The wire connection portion 211 has a first surface 213 that faces the collar 220. The wire connection portion 211 has a second surface 217 that faces a lower surface 251 of the wire 250. The wire connection portion 211 may receive an electrical current from the wire 250 and may transmit an electrical current to the pin connection portion 214 of the male connector 210.

In FIG. 3, the wire connection portion 211 has a hexagonal cross-sectional shape. In other embodiments, the wire connection portion 211 may have a cross-sectional shape that is a circle, a circular segment, a circular sector, an oval, a polygon, a rounded polygon, or other geometric shape. The wire connection portion 211 may have a length that is approximately in a range of 100-150% of the width of the wire connection portion 211.

In some embodiments, the wire connection portion 211 has a protruding portion 212, as in FIG. 3. The protruding portion 212 has a lateral surface 218 that faces the lateral surface 252 of the wire 250. In FIG. 4, the lateral surface 218 of the protruding portion 212 is flat. In other embodiments, the lateral surface 218 of the protruding portion 212 may have a surface that is convex, concave, rough, or has other surface geometry. In FIG. 3, the protruding portion 212 of the wire connection portion 211 has a circular segment cross-sectional shape. The protruding portion 212 of the wire connection portion 211 may have a cross-sectional shape that is a circle, a circular segment, a circular sector, an oval, a polygon, a rounded polygon, or other geometric shape.

The protruding portion 212 of the wire connection portion 211 may have a maximum cross-sectional width (e.g., a diameter where the cross-sectional shape is circular) that is approximately in a range of 100-150% of the width of the wire 250. In some embodiments, the protruding portion 212 of the wire connection portion 211 may have a uniform cross-sectional width. In other embodiments, the protruding portion 212 of the wire connection portion 211 may have a cross-sectional width that varies over the length of the protruding portion 212. In FIG. 3, the end of the protruding portion 212 of the wire connection portion 211 is rounded. In other embodiments, the end of the protruding portion 212 of the wire connection portion 211 may be beveled, chamfered, flat, pointed, or have another shape. The protruding portion 212 of the wire connection portion 211 may have a length that is approximately 100-150% of the width of wire 250.

The wire 250 has a lower surface 251 that faces the second surface 217 of the wire connection portion 211. The wire 250 has a lateral surface 252 that faces the lateral surface 218 of the protruding portion 212. In FIG. 4, the lateral surface 252 of the wire 250 is flat. In other embodiments, the lateral surface 252 of the wire 250 may have a surface that is convex, concave, rough, or has other surface geometry. The wire 250 may be connected to the wire connection portion 211 of the male connector 210 by ultrasonic welding, laser welding, brazing, soldering, or other suitable connecting processes. Preferably, ultrasonic welding or laser welding is used. Connecting the wire 250 to the wire connection portion 211 of the male connector includes connecting the lateral surface 252 of the wire 250 to the lateral surface 218 of the protruding portion 212 of the wire connection portion 211 and connecting the lower surface 251 of the wire 250 to the second surface 217 of the wire connection portion 211.

The wire 250 may be made of copper, aluminum, or other suitable materials. In some embodiments, the wire 250 may be a multi-strand wire. In other embodiments, the wire 250 may be a single-strand wire. The wire 250 may have a minimum cross-sectional area that is approximately in a range of 25-50 $mm^2$.

In some embodiments, a wire insulation shield 258 surrounds the wire 250. The wire insulation shield 258 insulates the wire 250 from the hot environment that the wire 250 and the electrical connector 200 may be operating in and may improve conduction of electrical current from the wire 250 to the electrical connector 200. The wire insulation shield 258 may be made of suitable insulating materials.

The male connector 210 also includes a pin connection portion 214 configured to contact a conductor pin 260 (e.g., cold pin, heater conductor, etc.) in an electrically conductive manner (e.g., permitting an electrical current to be transmitted). The pin connection portion 214 may receive an electrical current from the wire connection portion 211 of the male connector 210 and may transmit an electrical current to the conductor pin 260. The conductor pin 260 may be made of nickel-clad copper or other suitable materials.

The pin connection portion 214 has a circular cross-sectional shape. The pin connection portion 214 has an outer diameter $D_1$ that is less than that of the wire connection portion 211. The pin connection portion 214 may have a length that is approximately in a range of 0.09-0.125 in. (approximately 2.2-3.2 mm).

The pin connection portion 214 has male threads 216 (e.g., external threads) configured to connect to a nut 230. In FIG. 3, the male threads 216 are positioned with a uniform spacing between each of the male threads 216. In other embodiments, the male threads 216 may be positioned with spacing that varies between the male threads 216. The male threads 216 may have a spacing (e.g., thread pitch) that is approximately in a range of 1-1.5 mm between each of the male threads. In FIG. 3, the male threads 216 have a diameter that is uniform over the length of the pin connection portion 214. The male threads 216 may have a rotational orientation that is clockwise or counter-clockwise. The male threads 216 may be tapered threads.

The electrical connector 200 also includes a collar 220. The collar 220 is configured to surround the conductor pin 260. The collar 220 may be made of copper, nickel-plated copper, silver, or other suitable materials.

The collar 220 includes a collar cylindrical body portion 222. The collar cylindrical body portion 222 may be connected to the conductor pin 260 by crimping or by other suitable connecting processes.

The collar cylindrical body portion 222 has a maximum outer diameter that is approximately in a range of ⅙-¼ in. (4.2-6.4 mm). The wall of the collar cylindrical body portion 222 may have a maximum width that is approximately in a range of 0.06-0.09 in. (approximately 1.5-2.3 mm).

The collar 220 also includes a collar outer flange 224. The collar outer flange 224 is positioned such that a first surface 225 of the collar outer flange 224 is configured to contact the pin connection portion 214 of the male connector 210. The collar outer flange 224 has a second surface 226 that is opposite the first surface 225. The collar outer flange 224 may be connected to the conductor pin 260 by welding, brazing, soldering or by other suitable connecting processes. In some embodiments, when the collar outer flange 224 is brazed to the conductor pin 260, silver brazing is used.

In FIG. 4, the collar outer flange 224 has an annular cross-sectional shape. The collar outer flange 224 has an outer diameter D2 that is larger than that of the collar cylindrical body portion 222. The collar outer flange 224 may have a maximum outer diameter D2 that is approximately in a range of 0.23-0.50 in. (5.84-12.7 mm). The collar outer flange 224 may have a length that is approximately in a range of 1⁄16-¼ in. (approximately 1.5-6.4 mm).

The electrical connector 200 also includes a nut 230. The nut 230 is configured to surround the pin connection portion 214 of the male connector 210, the collar outer flange 224, and part of the collar cylindrical body portion 222. The nut 230 is capable of spinning freely (e.g., independently) of the wire 250, male connector 210, collar 220, and the conductor pin 260. The nut 230 may be made of brass or other suitable materials. In FIG. 3, the nut 230 has a hexagonal outer surface 238. In other embodiments, the nut 230 may be a square nut, wing nut, or knurled nut.

The nut 230 includes a nut cylindrical body portion 232. The nut cylindrical body portion 232 has an end surface 233 that faces the first surface 213 of the wire connection portion 211. The nut cylindrical body portion 232 has female threads (e.g., internal threads) that are configured to connect to the male threads 216 of the pin connection portion 214 of the male connector 210. The nut 230 may have an undercut 236 (e.g., recess, groove, cavity) that allows for machining of the female threads of the nut cylindrical body portion 232. The female threads are configured to engage with the male threads 216 of the pin connection portion 214 of the male connector 210.

The nut cylindrical body portion 232 may have a maximum width that is approximately in a range of ⅜-1 in. (approximately 9.5-25.4 mm. The nut cylindrical body portion 232 may have a length that is approximately in a range of 100-150% of the width of the nut cylindrical body portion 232.

The nut 230 also includes a nut inner flange 234. The nut inner flange 234 has a first surface 235 that faces the second surface 226 of the collar outer flange 224. The nut inner flange 234 has an inner diameter D3 that is less than that of the nut cylindrical body portion 232.

The electrical connector 200 also includes a first seal 240. The first seal 240 surrounds the collar cylindrical body portion 222 and is positioned between the second surface 226 of the collar outer flange 224 and the first surface 235 of the nut inner flange 234. When the nut 230 is tightened, the first seal 240 functions as a barrier between collar 220 and the nut 230 that prevents moisture from collecting on and/or near, and prevents corroding, the pin connection portion 214 of the male connector 210, the collar outer flange 224, a portion of the conductor pin 260, and the connection between the pin connection portion 214 of the male connector 210, the collar outer flange 224, and the conductor pin 260.

In FIG. 4, the first seal 240 has an annular cross-sectional shape. The first seal 240 may be made of silicone or other suitable materials (e.g., materials capable of withstanding a temperature of approximately 180 degrees Celsius). The first seal 240 may have a thickness (e.g., a length) that is approximately in a range of 0.5-2 mm. The first seal 240 may have a width (e.g., a difference between an inner diameter and the outer diameter) that is approximately in a range of 0.5-2 mm.

The electrical connector 200 also includes a second seal 242. The second seal 242 surrounds the pin connection portion 214 of the male connector 210 and is positioned between the end surface 233 of the nut cylindrical body portion 232 and the first surface 213 of the wire connection portion 211. When the nut 230 is tightened, the second seal 242 functions as a barrier between the nut 230 and the wire connection portion 211 of the male connector 210 that prevents moisture from collecting on and/or near, and prevents corroding, the pin connection portion 214 of the male connector 210, the collar outer flange 224, a portion of the conductor pin 260, and the connection between the pin connection portion 214 of the male connector 210, the collar outer flange 224, and the conductor pin 260.

In FIG. 4, the second seal 242 has an annular cross-sectional shape. The second seal 242 may be made of silicone or other suitable materials (e.g., materials capable of withstanding a temperature of approximately 180 degrees Celsius). In some embodiments, both the first seal 240 is made of silicone and the second seal 242 is made of silicone.

In some embodiments, an electrical isolation cover surrounds a portion of the wire insulation shield 258, a portion of the wire 250, the male connector 210, the collar 220, the nut 230, the first seal 240, the second seal 242, and a portion of the conductor pin 260. The electrical isolation cover may have a cross-sectional shape that is a circle, a circular segment, a circular sector, an oval, a polygon, a rounded polygon, or other geometric shape. In some embodiments, the electrical isolation cover has a length of 55 mm.

Methods of Making an Electrical Connection

An example method for making an electrical connection includes providing an electrical connector 200. The method also includes inserting the conductor pin 260 into the collar 220 so that the conductor pin 260 contacts the pin connection portion 214 of the male connector 210. The method also includes crimping the collar cylindrical body portion 222 to the conductor pin 260. The method also includes attaching the collar outer flange 224 to the conductor pin 260. The method also includes attaching the wire 250 to the wire connection portion 211 of the male connector 210. The method also includes tightening the nut 230 to connect the pin connection portion 214 of the male connector 210, the collar 220, the conductor pin 260, the first seal 240, and the second seal 242. In some embodiments, attaching the collar outer flange 224 to the conductor pin 260 includes welding or brazing the collar outer flange 224 to the conductor pin 260. In some embodiments, attaching the wire 250 to the wire connection portion 211 of the male connector 210 includes ultrasonically welding the wire 250 to the wire connection portion 211.

The method includes providing an electrical connector 200. The electrical connector 200 includes a male connector 210 having a wire connection portion 211 configured to be connected to a wire 250. The electrical connector 200 also includes a pin connection portion 214 having an outer diameter $D_1$ less than that of the wire connection portion 211. The pin connection portion 214 is configured to contact a conductor pin 260 in an electrically conductive manner and has male threads 216. The electrical connector 200 also includes a collar 220 configured to surround the conductor pin 260. The collar 220 has a collar cylindrical body portion 222, and a collar outer flange 224. The collar outer flange 224 has an outer diameter D2 larger than that of the collar cylindrical body portion 222, a first surface 225 configured to contact the pin connection portion 214 of the male connector 210, and a second surface 226 opposite the first surface 225. The electrical connector 200 also includes a nut 230 configured to surround the pin connection portion 214 of the male connector 210, the collar outer flange 224, and part of the collar cylindrical body portion 222. The nut 230 has a nut cylindrical body portion 232, and a nut inner flange 234. The nut inner flange 234 has an inner diameter D3 less than that of the nut cylindrical body portion 232, and has a first surface 235 that faces the second surface 226 of the collar outer flange 224. The electrical connector 200 also includes a first seal 240 that surrounds the collar cylindrical body portion 222 and is positioned between the second surface 226 of the collar outer flange 224 and the first surface 235 of the nut inner flange 234. The electrical connector 200 also includes a second seal 242 that surrounds the pin connection portion 214 of the male connector 210 and is positioned between an end surface 233 of the nut cylindrical body portion 232 and a first surface 213 of the wire connection portion 211 that faces the collar 220. While the method is described with respect to the electrical connector 200, it should be appreciated that the operations of the method are equally applicable to any other electrical connector that includes components analogous to those described therein.

The method includes inserting the conductor pin 260 into the collar 220 so that the conductor pin 260 contacts the pin connection portion 214 of the male connector 210. The pin connection portion 214 of the male connector 210 contacts the conductor pin 260 in an electrically conductive manner.

The method includes crimping the collar cylindrical body portion 222 to the conductor pin 260.

The method includes attaching the collar outer flange 224 to the conductor pin 260. In some embodiments, the collar outer flange 224 is welded or brazed to the conductor pin 260.

The method includes attaching the wire 250 to the wire connection portion 211 of the male connector 210. In some embodiments, the wire 250 is ultrasonically welded to the wire connection portion 211 of the male connector 210. In other embodiments, the wire 250 is laser welded to the wire connection portion 211 of the male connector 210.

The method includes tightening the nut 230 to connect the pin connection portion 214 of the male connector 210, the collar 220, the conductor pin 260, the first seal 240, and the second seal 242. Tightening the nut 230 allows the first seal 240 and the second seal 242 to prevent moisture from collecting on and/or near, and prevent corroding, the pin connection portion 214 of the male connector 210, the collar outer flange 224, a portion of the conductor pin 260, and the connection between the pin connection portion 214 of the male connector 210, the collar outer flange 224, and the conductor pin 260.

CONSTRUCTION OF EXAMPLE EMBODIMENTS

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. An electrical connector comprising:

a male connector comprising:

a wire connection portion configured to be connected to a wire, and a pin connection portion having an outer diameter less than that of the wire connection portion, the pin connection portion being configured to contact a conductor pin in an electrically conductive manner, the pin connection portion comprising male threads;

a collar configured to surround the conductor pin, the collar comprising:

a collar cylindrical body portion, and a collar outer flange having an outer diameter larger than that of the collar cylindrical body portion, the collar outer flange having a first surface configured to contact the pin connection portion of the male connector, and a second surface opposite the first surface;

a nut configured to surround the pin connection portion of the male connector, the collar outer flange, and part of the collar cylindrical body portion, the nut comprising:

a nut cylindrical body portion, and a nut inner flange having an inner diameter less than that of the nut cylindrical body portion, the nut inner flange having a first surface that faces the second surface of the collar outer flange;

a first seal that surrounds the collar cylindrical body portion and is positioned between the second surface of the collar outer flange and the first surface of the nut inner flange; and a second seal that surrounds the pin connection portion of the male connector and is positioned between an end surface of the nut cylindrical body portion and a first surface of the wire connection portion that faces the collar.

2. The electrical connector of claim 1, wherein the male connector comprises copper.

3. The electrical connector of claim 1, wherein the collar comprises copper or nickel-plated copper.

4. The electrical connector of claim 1, wherein the nut comprises brass.

5. The electrical connector of claim 1, wherein the nut has a hexagonal outer surface.

6. The electrical connector of claim 1, wherein each of the first seal and the second seal comprises silicone.

7. An electrical connector assembly comprising:

the electrical connector of claim 1; and a wire ultrasonically welded to the wire connection portion of the male connector.

8. The electrical connector assembly of claim 7, wherein the wire comprises copper.

9. An electrical connector assembly comprising:

the electrical connector of claim 1; and a conductor pin comprising nickel-clad copper.

10. An aftertreatment system comprising:

a heater comprising a conductor pin;

a heater power source comprising a wire; and an electrical connector comprising:

a male connector comprising:

a wire connection portion configured to be connected to the wire, and a pin connection portion having an outer diameter less than that of the wire connection portion, the pin connection portion being configured to contact the conductor pin in an electrically conductive manner, the pin connection portion comprising male threads;

a collar configured to surround the conductor pin, the collar comprising:

a collar cylindrical body portion, and a collar outer flange having an outer diameter larger than that of the collar cylindrical body portion, the collar outer flange having a first surface configured to contact the pin connection portion of the male connector, and a second surface opposite the first surface;

a nut configured to surround the pin connection portion of the male connector, the collar outer flange, and part of the collar cylindrical body portion, the nut comprising:

a nut cylindrical body portion, and a nut inner flange having an inner diameter less than that of the nut cylindrical body portion, the nut inner flange having a first surface that faces the second surface of the collar outer flange;

a first seal that surrounds the collar cylindrical body portion and is positioned between the second surface of the collar outer flange and the first surface of the nut inner flange; and a second seal that surrounds the pin connection portion of the male connector and is positioned between an end surface of the nut cylindrical body portion and a first surface of the wire connection portion that faces the collar.

11. The aftertreatment system of claim 10, wherein the male connector comprises copper.

12. The aftertreatment system of claim 10, wherein the collar comprises copper or nickel-plated copper.

13. The aftertreatment system of claim 10, wherein the nut comprises brass.

14. The aftertreatment system of claim 10, wherein the nut has a hexagonal outer surface.

15. The aftertreatment system of claim 10, wherein each of the first seal and the second seal comprises silicone.

16. The aftertreatment system of claim 10, wherein the wire is ultrasonically welded to the wire connection portion of the male connector.

17. The aftertreatment system of claim 10, wherein the wire comprises copper.

18. The aftertreatment system of claim 10, wherein the conductor pin comprises nickel-clad copper.

19. A method of making an electrical connection, the method comprising:

providing an electrical connector comprising:

a male connector comprising:

a wire connection portion configured to be connected to a wire, and a pin connection portion having an outer diameter less than that of the wire connection portion, the pin connection portion being configured to contact a conductor pin in an electrically conductive manner, the pin connection portion comprising male threads;

a collar configured to surround the conductor pin, the collar comprising:

a collar cylindrical body portion, and a collar outer flange having an outer diameter larger than that of the collar cylindrical body portion, the collar outer flange having a first surface configured to contact the pin connection portion of the male connector, and a second surface opposite the first surface;

a nut configured to surround the pin connection portion of the male connector, the collar outer flange, and part of the collar cylindrical body portion, the nut comprising:

a nut cylindrical body portion, and a nut inner flange having an inner diameter less than that of the nut cylindrical body portion, the nut inner flange having a first surface that faces the second surface of the collar outer flange;

a first seal that surrounds the collar cylindrical body portion and is positioned between the second surface of the collar outer flange and the first surface of the nut inner flange; and a second seal that surrounds the pin connection portion of the male connector and is positioned between an end surface of the nut cylindrical body portion and a first surface of the wire connection portion that faces the collar;

inserting the conductor pin into the collar so that the conductor pin contacts the pin connection portion of the male connector;

crimping the collar cylindrical body portion to the conductor pin;

attaching the collar outer flange to the conductor pin;

attaching the wire to the wire connection portion of the male connector; and tightening the nut to connect the pin connection portion of the male connector, the collar, the conductor pin, the first seal, and the second seal.

20. The method of claim 19, wherein the male connector comprises copper.

21. The method of claim 19, wherein the collar comprises copper or nickel-plated copper.

22. The method of claim 19, wherein the nut comprises brass.

23. The method of claim 19, wherein the nut has a hexagonal outer surface.

24. The method of claim 19, wherein each of the first seal and the second seal comprises silicone.

25. The method of claim 19, wherein the step of attaching the collar outer flange to the conductor pin comprises welding or brazing the collar outer flange to the conductor pin.

26. The method of claim 19, wherein the step of attaching the wire to the wire connection portion of the male connector comprises ultrasonically welding the wire to the wire connection portion.

27. The method of claim 19, wherein the wire comprises copper.

28. The method of claim 19, wherein the conductor pin comprises nickel-clad copper.

* * * * *